US010463199B2

(12) United States Patent
Coratolo et al.

(10) Patent No.: US 10,463,199 B2
(45) Date of Patent: Nov. 5, 2019

(54) CLIP FOR A SHOWER CADDY AND SHOWER CADDY WITH INTEGRATED CLIP

(71) Applicant: Zenith Products Corporation, New Castle, DE (US)

(72) Inventors: Frank Coratolo, Blackwood, NJ (US); Joseph Vaccaro, West Chester, PA (US)

(73) Assignee: Decolin Inc. (CA)

( * ) Notice: Subject to any disclaimer, the term of this patent is extended or adjusted under 35 U.S.C. 154(b) by 312 days.

(21) Appl. No.: 15/187,192

(22) Filed: Jun. 20, 2016

(65) Prior Publication Data

US 2017/0360261 A1 Dec. 21, 2017

(51) Int. Cl.
*A47K 3/28* (2006.01)
*F16B 2/22* (2006.01)

(52) U.S. Cl.
CPC ............... *A47K 3/281* (2013.01); *F16B 2/22* (2013.01)

(58) Field of Classification Search
CPC ............. F16B 2/22; F16B 2/205; A47K 3/281
USPC ............................................ 24/545; 211/113
See application file for complete search history.

(56) References Cited

U.S. PATENT DOCUMENTS

| | | | | |
|---|---|---|---|---|
| 1,868,726 A * | 7/1932 | Collier | .................... | D06F 55/00 174/135 |
| 2,519,987 A * | 8/1950 | Wernette | ................. | D06F 55/00 24/561 |
| 3,141,221 A * | 7/1964 | Faulls, Jr. | .......... | B65D 33/1666 206/1.5 |
| 5,160,105 A * | 11/1992 | Miller | .................... | A47B 91/04 248/188.9 |
| 5,666,702 A * | 9/1997 | Ming-Chieh | .......... | B42F 1/006 24/338 |
| D487,482 S * | 3/2004 | Disher | .......................... | D19/65 |
| D496,549 S | 9/2004 | Snell | | |
| 6,971,381 B2 * | 12/2005 | Langford | ............ | A61M 15/009 128/200.23 |
| D568,658 S | 5/2008 | Yang et al. | | |
| D628,000 S | 11/2010 | Lindo | | |
| 8,573,416 B2 * | 11/2013 | Didehvar | ............... | A47B 45/00 211/119.009 |
| 8,769,781 B2 * | 7/2014 | Carney | .................. | A47K 3/281 24/457 |

(Continued)

*Primary Examiner* — Abigail E Troy
(74) *Attorney, Agent, or Firm* — Christopher J. Owens; Leech Tishman Fuscaldo & Lampl

(57) ABSTRACT

A clip is provided, separately or integrated into a shower caddy, for removably suspending the shower caddy from a cylindrical arm to which a showerhead is attached. The clip includes a flexible body having first and second legs mirrored about a central axis thereof. The first and second legs define individual base ends and a bottom opening of the clip therebetween. The legs further define a generally central semi-cylindrical channel therebetween. The channel has an intermediate opening, between the channel and the bottom opening and contiguous with the bottom opening, for slidably receiving the cylindrical arm therethrough. The respective base ends of the first and second legs elastically flex around the diameter of the cylindrical arm to receive the cylindrical arm in the channel, and, thereafter, return toward an original configuration thereof, thereby gripping and removably securing the cylindrical arm within the channel.

5 Claims, 5 Drawing Sheets

(56) References Cited

U.S. PATENT DOCUMENTS

| | | |
|---|---|---|
| D714,571 S | 10/2014 | Walker |
| D770,197 S | 11/2016 | Yang et al. |
| 9,693,660 B1 | 7/2017 | Stelmarski et al. |
| 2008/0047913 A1 | 2/2008 | Stark |
| 2010/0102014 A1 | 4/2010 | Yang |
| 2012/0091088 A1 | 4/2012 | Didehvar et al. |
| 2014/0224754 A1 | 8/2014 | Baines |
| 2014/0319083 A1 | 10/2014 | Stark |
| 2015/0342419 A1 | 12/2015 | Yatscoff |

* cited by examiner

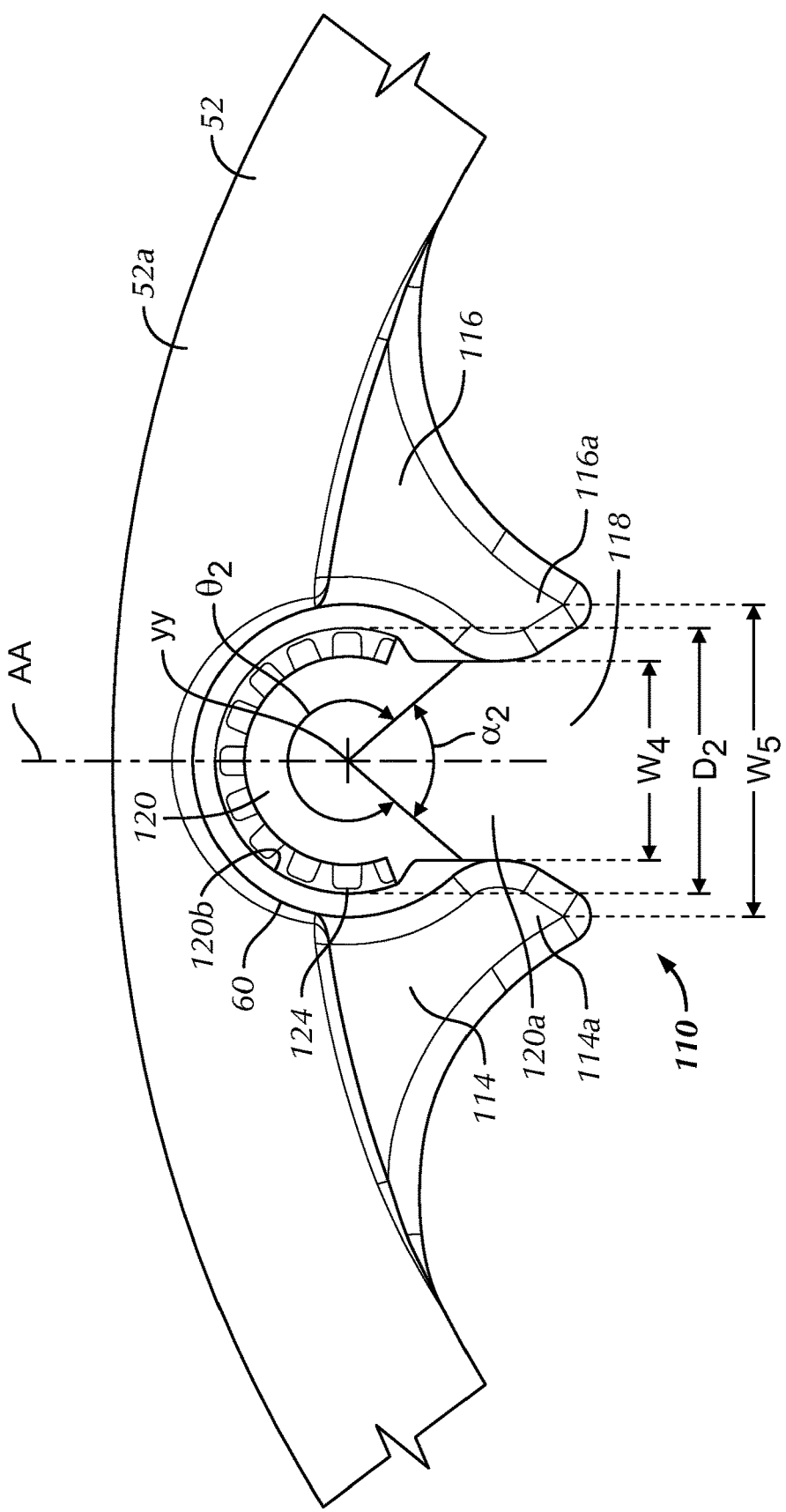

CLIP FOR A SHOWER CADDY AND SHOWER CADDY WITH INTEGRATED CLIP

BACKGROUND OF THE INVENTION

The present invention relates to a clip for removably suspending a shower caddy from a showerhead assembly, and a shower caddy having an integrated clip.

It is often desirable to have an assembly capable of supporting a variety of bathing articles that a user generally requires when bathing or taking a shower. Numerous types of shower caddies have been developed to support such articles so that a person taking a shower can readily access such articles. One type of such conventional shower caddies includes caddies which are suspended from a showerhead assembly, i.e., from the cylindrical arm or pipe extending between a wall and the showerhead.

One essential feature of such shower caddies is to be securely, removably attachable to the showerhead assembly, which may often be slippery, e.g., from water or steam generation during bathing or showering. Otherwise, a loosely suspended shower caddy may slip and fall from the showerhead assembly in its entirety, or, alternatively, the shower caddy may tilt, e.g., when inserting or removing a bathing article therefrom, leading to bathing article(s) falling out of the shower caddy.

Thus, it is desirable to provide an improved clip for attachment to a shower caddy, for securely suspending the shower caddy from the showerhead assembly therefrom, and an improved shower caddy having such a clip integrated therein.

BRIEF SUMMARY OF THE INVENTION

Briefly stated, one aspect of the present invention is directed to a clip for removably suspending a shower caddy from a cylindrical arm to which a showerhead is attached. The clip comprises a flexible, generally horse-shoe shaped polymeric body having first and second legs mirrored about a central axis of the clip, defining (i) a front face of the body and a rear face of the body; (ii) a contiguous semi-circular upper end, (iii) respective individual bulbous base ends having respective facing apex surfaces defining an open base end of the body and (iv) respective exterior side surfaces facing away from one another proximate the base end of the body and extending to the semi-circular upper end. The first and second legs further define a generally central semi-cylindrical channel therebetween. The channel extends from the front face of the body to the rear face of the body and is generally C-shaped in cross-section. The channel has an intermediate opening between the respective apex surfaces of the first and second legs for slidably receiving the cylindrical arm therethrough. The channel spans approximately 280° to approximately 290° about a longitudinal axis of the channel and the intermediate opening spans approximately 70° to approximately 80° about the longitudinal axis of the channel. The intermediate opening of the channel defines a width less than a diameter of the semi-cylindrical channel and less than a diameter of the cylindrical arm. Accordingly, the bulbous base ends of the respective first and second legs elastically flex outwardly and around the diameter of the cylindrical arm to receive the cylindrical arm in the channel, and, thereafter, return toward an original configuration thereof, thereby gripping and removably securing the cylindrical arm within the channel.

Another aspect of the present invention is directed to a shower caddy for suspending from a cylindrical arm to which a showerhead is attached. The shower caddy comprises an elongated frame generally extending in a first plane, the frame having an upper frame member, a lower frame member, a left-side frame member extending between the upper and lower frame members and an opposing right-side frame member extending between the upper and lower frame members, together forming a contiguous frame structure having an exterior surface and an interior surface. The shower caddy also includes at least one shelf extending from the left-side and right-side frame members in a second plane generally perpendicular to the first plane. A clip is positioned in the upper frame member for removably engaging and gripping the cylindrical arm. The clip comprises opposing first and second legs extending downwardly from the interior surface of the upper frame member. The first and second legs are mirrored about a central axis of the frame and define a bottom opening between respective base ends thereof facing the lower frame member.

The first and second legs and the upper frame member define a generally central semi-cylindrical channel therebetween. The channel extends from a front face of the legs and the frame to a rear face of the legs and the frame. At least an upper portion of the channel is defined by a semi-circular cutout in the upper frame member. The channel has an intermediate opening between the channel and the bottom opening for slidably receiving the cylindrical arm therethrough. The intermediate opening of the channel is contiguous with the bottom opening between the first and second legs and defines a width less than a diameter of the semi-cylindrical channel and less than a diameter of the cylindrical arm. The channel spans approximately 295° to approximately 305° about a longitudinal axis of the channel and the intermediate opening spans approximately 55° to approximately 65° about the longitudinal axis of the channel. Accordingly, the respective base ends of the first and second legs elastically flex around the diameter of the cylindrical arm to receive the cylindrical arm in the channel, and, thereafter, return toward an original configuration thereof, thereby gripping and removably securing the cylindrical arm within the channel.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings a preferred embodiment of a clip for a shower caddy, as well as a shower caddy having such a clip integrated therein. It should be understood, however, that the invention is not limited to the precise arrangements and instrumentalities shown. In the drawings:

FIG. 7 is an enlarged front elevational view of an upper frame member of the shower caddy of FIG. 6, including the integrated clip.

DETAILED DESCRIPTION OF THE INVENTION

Figure 1:
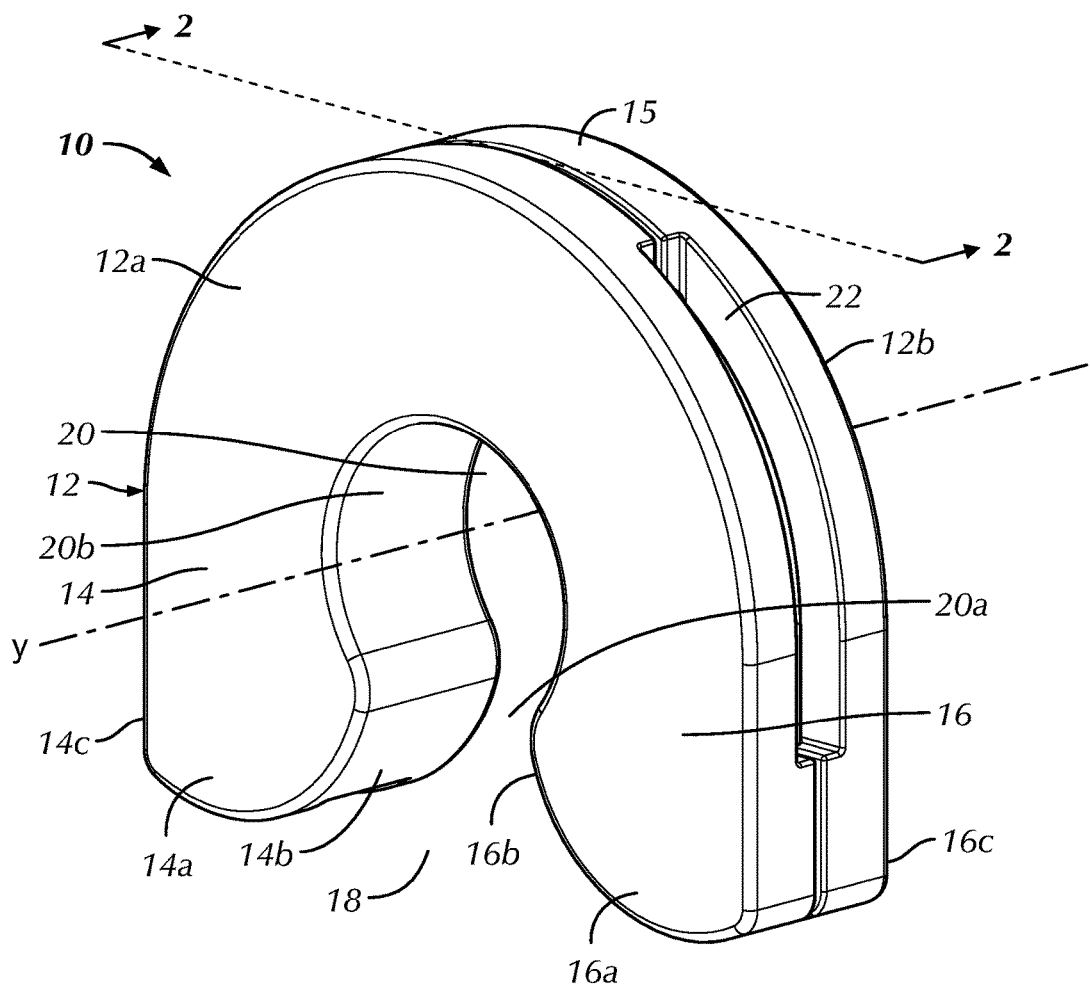
FIG. 1 is a front and left side perspective view of a clip for removably attaching and suspending a shower caddy to a cylindrical arm extending from a showerhead.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the clip and/or shower caddy, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be noted that the terms "first," "second," "third" and the like may be used herein to modify various elements. These modifiers do not imply a spatial, sequential, or hierarchical order to the modified elements unless specifically stated. It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-5 a clip, generally designated 10, in accordance with a preferred embodiment of the present invention. The clip 10 is attachable to a shower caddy (not shown), removably or permanently, as will be described in further detail below. The clip 10 is also removably securable to a cylindrical arm or pipe (not shown) extending from a showerhead (not shown), for suspending the shower caddy from the cylindrical arm/showerhead, as will also be described below.

Figure 2:
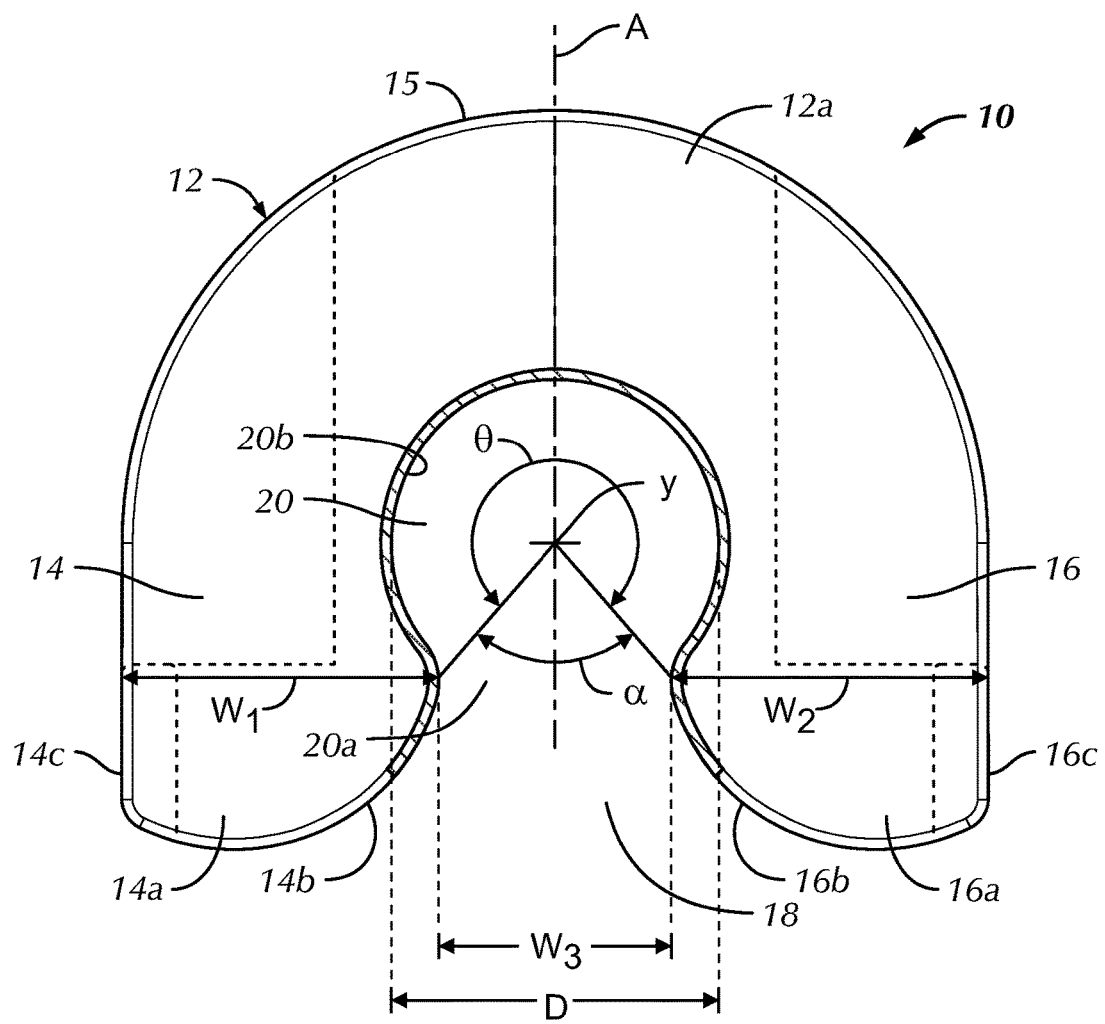
FIG. 2 is a cross-sectional elevational view of the clip of FIG. 1, taken along sectional line 2-2.
Figure 3:
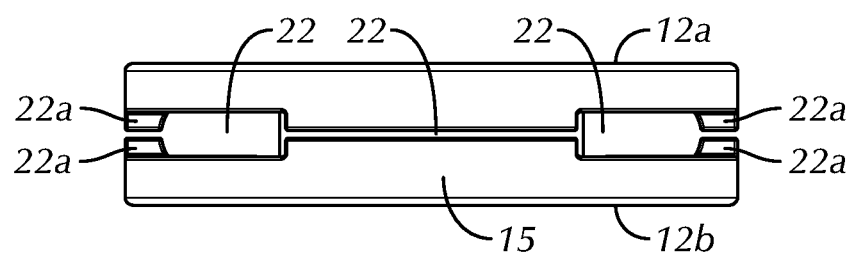
FIG. 3 is a top plan view of the clip of FIG. 1.
Figure 4:
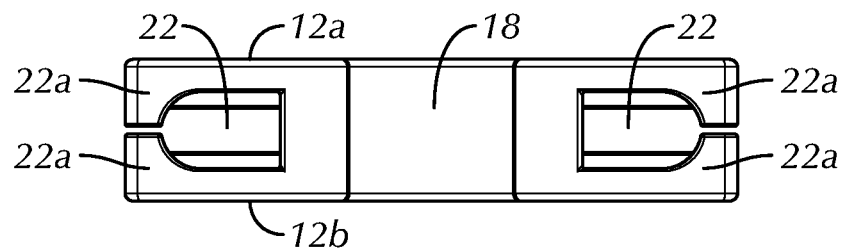
FIG. 4 is a bottom plan view of the clip of FIG. 1.
Figure 5:
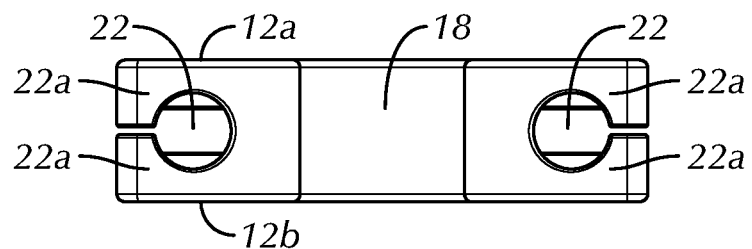
FIG. 5 is another bottom plan view of the clip of FIG. 1, illustrating an exemplary alternatively shaped groove of the clip.

As shown best in FIGS. 1 and 2, the clip 10 includes a flexible, generally horse-shoe shaped monolithic, polymeric body 12. For example, the polymeric body 12 may be an elastomeric body. As should be understood by those of ordinary skill in art, however, the body 12 may alternatively be formed of separate, attached components, i.e., not monolithic, and/or the body 12 may be constructed of other flexible materials, capable of performing the functions of the clip 10 as described herein.

The body 12 includes first and second legs 14, 16 mirrored about a central axis A (FIG. 2) of the clip 10, having a front face 12a and an opposing rear face 12b. In the illustrated embodiment, the front and rear faces 12a, 12b are generally planar. Alternatively, however, the front and rear faces 12a, 12b may be non-planar. The body 12 also defines a contiguous semi-circular upper end 15, substantially half of which is formed by an upper portion of the first leg 14 and substantially the other half of which is formed by an upper portion of the second leg 16, about the central axis A.

The first and second legs 14, 16 include respective, bulbous base ends 14a, 16a, defining the base end of the horse-shoe shaped body 12. Particularly, the bulbous base ends 14a, 16a define an open base end 18 of the body 12. The bulbous base ends 14a, 16a also include respective apex, interior surfaces 14b, 16b, facing one another, and respective exterior side surfaces 14c, 16c proximate the base end 18 of the body 12 and facing away from one another. The exterior side surfaces 14c, 16c extend from the base end 18 of the body 12 to the semi-circular upper end 15 thereof. The bulbous base ends 14a, 16a also define respective maximum widths $W_1$ and $W_2$, defined from the respective exterior side surfaces 14c, 16c thereof to the respective apex interior surfaces 14b, 16b thereof. In the illustrated embodiment, the respective maximum widths $W_1$ and $W_2$ of the bulbous base ends 14a, 16a are equal. Alternatively, however, and as should be understood, the widths $W_1$ and $W_2$ may be unequal.

As shown in FIGS. 1 and 2, the first and second legs 14, 16 further define a generally central, semi-circular channel 20 therebetween. The channel 20 extends from the front face 12a of the body 12 to the rear face 12b of the body 12, and defines a central, longitudinal axis Y in the same direction (from the front face 12a to the rear face 12b). As shown best in FIG. 2, the channel 20 is generally C-shaped in cross-section and has an opening 20a, at a base end thereof, between the respective apex surfaces interior 14b, 16b of the first and second legs 14, 16, for slidably receiving the cylindrical arm (not shown) therethrough, as will be described further below. In the illustrated embodiment, the channel 20 defines a generally smooth receiving surface 20b. As should be understood by those of ordinary skill in the art, however, the surface 20b may alternatively include features and/or properties, currently known or that later become known, selected for additional gripping. For example, without limitation, the surface 20b may be a ridged surface and/or include material having a high friction force. Alternatively or additionally, the channel 20 may include a complementary arcuate gripping insert for gripping the cylindrical arm.

In the illustrated embodiment, the semi-circular channel 20 spans an angle θ about the central, longitudinal axis Y, and the opening 20a of the channel 20 spans an angle α relative to the central, longitudinal axis Y. The opening 20a also defines a width $W_3$. In the illustrated embodiment, the maximum widths $W_1$ and $W_2$ of the bulbous base ends 14a, 16a, respectively, are greater than the width $W_3$ of the opening 20a. In alternative embodiments, however, the width $W_3$ may be greater than the widths $W_1$ and $W_2$. In a currently preferred embodiment, the channel 20 spans approximately 280° to approximately 290° about the central, longitudinal axis Y, and the opening 20a spans approximately 70° to approximately 80° relative to the central, longitudinal axis Y. The width $W_3$ of the opening 20a is, therefore, smaller than a diameter D of the channel 20, and, therefore, the width $W_3$ is also smaller than a diameter of the cylindrical arm (not shown) to be received within the channel 20. Accordingly, the bulbous base ends 14a, 16a of the respective first and second legs 14, 16 elastically flex radially outwardly and around the diameter of the cylindrical arm to receive the cylindrical arm in the channel 20.

Referring to FIGS. 1 and 3-5, the exterior surface of the body 12 includes at least one groove 22 for receiving a generally complementary connecting portion of a shower caddy (not shown), e.g., a portion of the shower caddy frame, therein. In the illustrated embodiment, the groove 22 is a continuous groove extending from the bulbous base end 14a to the bulbous base end 16b. As shown best in FIGS. 4 and 5, the groove 22 may define any of numerous different shapes and sizes to accommodate different types of shower caddy frames, e.g., round wire or shaped wire frames. As also shown, at least some portions of the groove 22 include a pair of opposing and facing lips 22a positioned at a radially outermost portion of the groove 22, i.e., along the exterior surface of the body 12. The facing lips 22a are elastically separable to receive the connecting portion of the shower caddy within the groove 22, and, thereafter, return to their original configuration (as shown in FIGS. 1 and 3-5), to removably secure the connecting portion of the shower caddy to the clip 10. Alternatively, and as also should be understood by those of ordinary skill in the art, the clip 10 may be integrated into the shower caddy frame, as will be described further below.

In operation, a clip 10 is engaged with a shower caddy, i.e., a portion of the frame of a shower caddy is inserted into the groove 22. Subsequently (or beforehand), the clip 10 is pressed down onto the cylindrical arm (not shown) extending from a showerhead (not shown), such that the bulbous base ends 14a, 16a of the respective first and second legs 14, 16 elastically flex radially outwardly and around the diameter of the cylindrical arm to receive the cylindrical arm in the channel 20, and, thereafter, return toward an original configuration thereof, thereby gripping the cylindrical aim positioned within the channel 20 and removably securing the cylindrical arm therein. The "pinching" of the bulbous base ends 14a, 16a around the cylindrical arm, in combination with the frictional between the cylindrical arm and the channel 20, holds the clip 10, and, therefore, the attached, shower caddy, securely onto the cylindrical arm. Thus, the shower caddy is suspended from the cylindrical arm.

Figure 6:
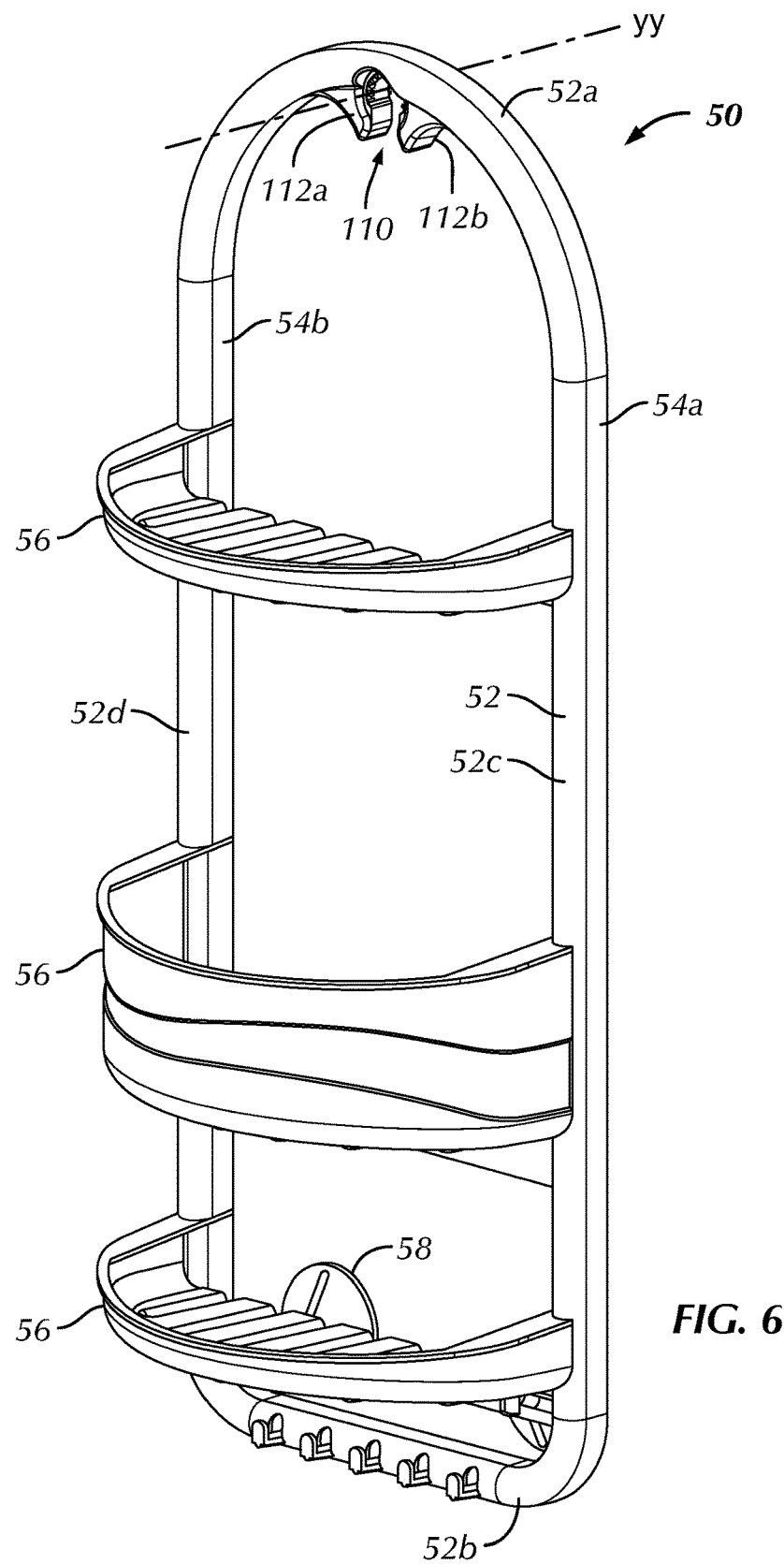
FIG. 6 is a front and left side perspective view of a shower caddy having an integrated clip for removably attaching and suspending a shower caddy to a cylindrical arm extending from a showerhead.

Referring to FIGS. 6-7, there is shown a shower caddy 50, having an integrated clip 110 for removably engaging and gripping a cylindrical arm or pipe (not shown), for suspending the shower caddy from the cylindrical arm/showerhead. As shown in FIG. 6, the shower caddy 50 includes an elongated frame 52 generally extending in a first plane, the frame having an upper frame member 52a, a lower frame member 52b, a left-side frame member 52c extending between the upper and lower frame members 52a, 52b, and an opposing right-side frame member 52d extending between the upper and lower frame members 52a, 52b, together forming a contiguous frame structure having an exterior surface 54a and an interior surface 54b. In one embodiment, the elongated frame 52 is a polymeric frame. Alternatively, however, the elongated frame 52 may be constructed of different materials, such as, for example, round or shaped wire.

As shown in FIG. 6, the shower caddy 50 further includes at least one shelf 56 (3 axially spaced shelves 56 in the illustrated embodiment) extending from the left-side and right-side frame members 52c, 52d of the frame 52 in a second plane generally perpendicular to the first plane. As shown, the shelves 56 may take the same or different form, e.g., size and shape, or a combination thereof. The shower caddy 50 also includes at least one suction cup 58 extending from the frame 52 in the second plane in a direction opposite to the direction of extension of the shelves 56, for attaching the shower caddy 50 to a wall (not shown) from which the cylindrical arm (connected to the showerhead) protrudes.

Referring to FIG. 7, the integrated clip 110 is positioned in the upper frame member 52a and includes opposing first and second legs 114, 116 mirrored about a central axis AA of the frame 52 and extending downwardly from the interior surface 54b of the upper frame member 52a. In the illustrated embodiment, the upper frame member 52a and the first and second legs 114, 116 are monolithic. However, as should be understood by those of ordinary skill in the art, the first and second legs 114, 116 may be constructed of formed of separate components attached to the frame 52. The first and second legs 114, 116 define a bottom opening 118 between respective base ends 114a, 116a thereof facing the lower frame member 52b. The clip 110, including the first and second legs 114, 116, has a front face 112a (on the same side of the frame 52 as the shelves 56) and an opposing rear face 112b.

The first and second legs 114, 116 and the upper frame member 52a define a generally central semi-cylindrical channel 120 therebetween. The channel 120 extends from the front face 112a of the legs 114, 116 and frame 52 to the rear face 112b of the legs 114, 116 and frame 52, and defines a central, longitudinal axis YY in the same direction (from the front face 112a to the rear face 112b). As shown best in FIG. 7, at least an upper portion of the channel 120 is defined by a semi-circular opening (e.g., cutout) 60 in the upper frame member 52a. The opposing base end of the channel 120 has an opening 120a, i.e., an intermediate opening between the channel 120 and the bottom opening 118 of the clip 110, for slidably receiving the cylindrical arm (not shown) therethrough. The intermediate opening 120a of the channel 120 is contiguous with the bottom opening 118, between the first and second legs 114.

In the illustrated embodiment, the semi-circular channel 120 spans an angle $\theta_2$ about the central, longitudinal axis YY, and the opening 120a of the channel 120 spans an angle $\alpha_2$ relative to the central, longitudinal axis YY. The opening 120a also defines a width $W_4$. In a currently preferred embodiment, the channel 120 spans approximately 295° to approximately 305° about the central, longitudinal axis YY, and the opening 120a spans approximately 55° to approximately 65° relative to the central, longitudinal axis YY. The width $W_4$ of the opening 120a is, therefore, smaller than a diameter $D_2$ of the channel 120, and, therefore, the width $W_4$ is also smaller than a diameter of the cylindrical arm (not shown) to be received within the channel 120.

As shown, the bottom opening 118 between the first and second legs 114, 116 is a tapered opening, progressively decreasing in width from a maximum width $W_5$, at a lowermost elevation of the bottom opening 118, to a minimum width, adjacent the intermediate opening 120a of the channel 120. Thus, the width $W_4$ of the intermediate opening 120a is equal to the minimum width of the bottom opening 118. Accordingly, the base ends 114a, 116a of the respective first and second legs 114, 116 elastically flex radially outwardly and around the diameter of the cylindrical arm to receive the cylindrical arm within the channel 120.

In the illustrated embodiment, the channel 120 also includes a complementary arcuate polymeric gripping insert 124 for gripping the cylindrical arm, attached to the interior surface of the channel 120. As should be understood by those of ordinary skill in the art, however, the interior surface of the channel 120 may alternatively include features and/or properties, currently known or that later become known, selected for additional gripping. For example, without limitation, the surface 120b may be a ridged surface and/or be constructed of a material having a higher friction force.

In operation, the clip 110 of the shower caddy 50 is pressed down onto the cylindrical arm (not shown) extending from a showerhead (not shown), such that the base ends 114a, 116a of the respective first and second legs 114, 116 elastically flex radially outwardly and around the diameter of the cylindrical arm to receive the cylindrical arm in the channel 120, and, thereafter, return toward an original configuration thereof, thereby gripping the cylindrical arm positioned within the channel 120 and removably securing the cylindrical arm therein. As explained above with respect to the clip 10, the "pinching" of the base ends 114a, 116a around the cylindrical arm, in combination with the frictional between the cylindrical arm and the polymeric gripping insert 124 of channel 120, holds the shower caddy 50 securely onto the cylindrical arm. Thus, the shower caddy is suspended from the cylindrical arm.

It will be appreciated by those skilled in the art that changes could be made to the respective embodiments of the clip 10 and the shower caddy 50 having a clip 110 described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A clip for removably suspending a shower caddy from a cylindrical arm to which a showerhead is attached, the clip comprising a flexible, generally horse-shoe shaped polymeric body having:

first and second legs mirrored about a central axis of the clip, defining (i) a front face of the body and a rear face of the body; (ii) a contiguous semi-circular upper end, (iii) respective individual bulbous base ends having respective facing apex surfaces defining an open base end of the body and (iv) respective exterior side surfaces facing away from one another proximate the base end of the body and extending to the semi-circular upper end;

the first and second legs further defining a central channel therebetween, the channel extending from the front face of the body to the rear face of the body and being generally C-shaped in cross-section, the channel having an intermediate opening between the respective apex surfaces of the first and second legs for slidably receiving the cylindrical arm therethrough;

the channel spanning approximately 280° to approximately 290° about a longitudinal axis of the channel and the intermediate opening spanning approximately 70° to approximately 80° about the longitudinal axis of the channel; and the intermediate opening of the channel defining a width less than a diameter of the channel;

such that the bulbous base ends of the respective first and second legs are structured and arranged to elastically flex outwardly and around the diameter of the cylindrical arm to receive the cylindrical arm in the channel, and thereafter return toward an original configuration thereof, thereby gripping and removably securing the cylindrical arm within the channel, wherein at least a portion of the exterior side surfaces of the first leg comprises a first groove and at least a portion of the exterior side surface of the second leg comprises a second groove, and wherein the first and second grooves are structured and arranged for receiving a connecting portion of the shower caddy therein, and wherein the first groove of the first leg is connected to the second groove of the second leg to thereby form a continuous groove extending from the bulbous base end of the first leg to the bulbous base end of the second leg.

2. The clip of claim 1, wherein the central channel defines a generally smooth receiving surface.

3. The clip of claim 1, wherein the polymeric body is an elastomeric body.

4. The clip of claim 1, wherein the body is monolithic.

5. The clip of claim 1, wherein the bulbous base ends of the respective first and second legs each define a maximum width, from the respective exterior side surface thereof to the respective apex surface thereof, greater than the width of the intermediate opening of the channel.

* * * * *